July 23, 1929.  F. R. HIGLEY  1,721,626

FASTENING MEANS

Filed Feb. 23, 1926

Inventor.

Frank R. Higley

Patented July 23, 1929.

1,721,626

UNITED STATES PATENT OFFICE.

FRANK R. HIGLEY, OF CLEVELAND HEIGHTS, OHIO, ASSIGNOR OF ONE-SIXTH TO CHARLES O. CHANDLER, OF CLEVELAND, OHIO, ONE-SIXTH TO A. L. COCHRAN, OF CLEVELAND HEIGHTS, OHIO, AND ONE-THIRD TO WALTER A. CLEAVELAND, OF EAST CLEVELAND, OHIO.

FASTENING MEANS.

Application filed February 23, 1926. Serial No. 90,031.

This invention relates to fastening means of the general type wherein a headed member is inserted into a hole or cavity in a relatively soft material such as wood, for the purpose of securing with the material an object such as a metal plate engaged by the head of the fastener. The objects of the invention are to provide a two-piece fastening which shall be securable with the greatest of ease, and to this end my invention contemplates preassembling the pieces of the fastener, and interlocking the pieces in preassembled relation, all in the manufacturing process.

Figure 1:
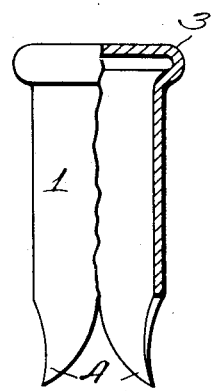
Figure 2:
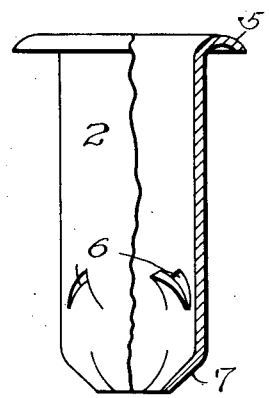
Figure 3:
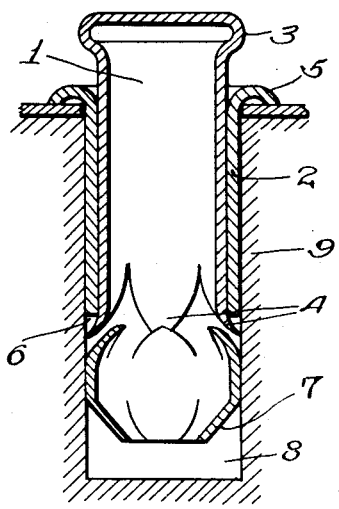
Figure 4:
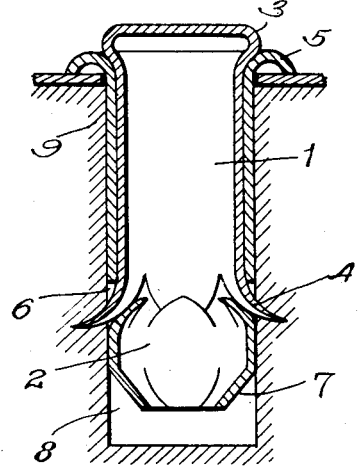

The exact nature of my invention will be apparent from the following description taken in connection with the accompanying drawings in which:

Figs. 1 and 2 are quarter sectional views of the inner and outer members respectively of a typical form of my invention, Figs. 3 and 4 show in half section, the members assembled to form a fastening unit shown in preliminary and secured relative positions respectively.

In the example chosen to illustrate my invention the fastener consists of two members pressed to shape or otherwise formed preferably of sheet metal. One of the members 1, is generally cylindrical but headed at one end as shown at 3, and at the other provided with sharply pointed prongs such as the furcations 4; the other member 2, is also generally cylindrical, turned out at one end to form a collar or flange 5 thereon, and provided near its other end with openings 6, to correspond with the prongs upon the headed member in a manner to be described; and the relative diameters of the members are such that the headed member will closely fit within the open ended flanged member.

The headed or inner member is preferably made of relatively hard spring material such as brass, and its prongs are preferably slightly sprung outwards. The openings upon the flanged or outer member are preferably made by punching out and bending inwardly portions of the member, as shown in Fig. 2, and are circumferentially located to correspond with the points upon the inner member, and longitudinally spaced so that when the members are in preliminary assembly, as in Fig. 3, with the prong points of the inner member just entering the openings in the outer member, the head end of the inner member will extend somewhat without the outer member. Preferably the resiliency of the prongs will be sufficient to so maintain the members in handling and the result will be a fastening unit composed of two members, interlocked in preassembled relation.

Preferably the end of the outer member is formed with somewhat of a taper as at 7, to facilitate its entry into the opening in which the fastening is to be secured. This opening 8 is bored out of relatively soft material 9, such as wood, to a diameter to fit the outer member although the opening need not be bottomed as shown, so that the fastener can be inserted freely therein until the object to be secured, such as the metal plate 10, is engaged between the surface of the material 9, in which the hole 8 has been prepared, and the flange of the outer fastening member.

The only further operation required to complete the securing of the plate 10 is a sharp blow upon the head of the inner member which will cause a telescoping to the position shown in Fig. 4. Upon such longitudinal movement of the inner member, however, the prongs thereon are engaged by the inwardly bent portions of the outer member and deflected through the holes therein, and into the surrounding material 9.

It will be noted that this last operation firmly seats the outer member in the hole and against the inner member, the inwardly deflecting portions of the outer member being in secure engagement with the outwardly projecting points of the inner member, so that the outward member is firmly secured by the inner member, that portion of the inner member which secures the outer member being in shear and therefore utilized to the fullest possible advantage. No strain upon the flange 2 will succeed in loosening the fastener for the reason that outward movement of the outer member would simply serve to more firmly secure the inner member in the material 9.

If it should be desired to remove the fastening, however, it is only necessary to first remove the inner member, which can be easily done making use of the head, whereupon the outer member may be readily lifted from the hole.

An advantage of my invention is the extremely easy and quick manner of effecting the engagement of the fastener in its secured position, and the additional fact that, provided the design of the members is proper, the engagement is assured by the single blow required. Another advantage is the relatively large flange area permitted the outer member by its construction, doing away with any necessity for use of a washer.

It will be apparent that the proportions, dimensions, materials and design of the members will vary with conditions such as the size of hole available, the nature of the material, and the strength required of the fastener. For example the number of prongs of the inner member and corresponding openings in the outer member may be varied from the four indicated in the drawings, and the prongs may be spaced longitudinally upon the inner member. Obviously any ornamental design desired may be placed upon the head, whether it is integral with or secured upon the inner member; and the flange of the outer member may be similarly ornamented. Nor need the members, particularly the inner one, be seamless circumferentially but can be rolled from a plane stamping.

Evidently these and numerous other variations in details of design may be as well employed without in any way exceeding the scope of my invention, and therefore what I claim is:

1. A two-piece fastener, comprising a pair of members pre-assembled, one extending within the other, the outer of said members being flanged at one end and having lateral openings, the inner of said members having one end normally projecting outwardly beyond the flanged end of the outer member and having prongs sprung outwardly to engagement with the outer member to maintain the members in said preassembled relation and adapted upon telescoping of said members to project outwardly through said openings, whereby the fastener may be handled as a unit and inserted as a unit into the parts to be fastened, and by a single blow upon its head may be driven to fastening engagement.

2. A two-piece fastener, comprising a pair of members pre-assembled one extending within the other, the outer of said members being flanged at one end and having lateral openings, the inner of said members having one end normally projecting outwardly beyond the flanged end of the outer member and having prongs sprung into said openings to interlock the members in said preassembled relation and adapted upon telescoping of said members to project outwardly through said openings, whereby the fastener may be handled as a unit and inserted as a unit into the parts to be fastened, and by a single blow upon its head may be driven to fastening engagement.

Signed by me, this 28th day of January, 1926.

FRANK R. HIGLEY.